US011374999B2

United States Patent
Håkansson et al.

(10) Patent No.: US 11,374,999 B2
(45) Date of Patent: Jun. 28, 2022

(54) METHODS AND ARRANGEMENTS FOR BINDING A DEVICE APPLICATION TO A WEB SERVICE

(71) Applicant: Telefonaktiebolaget LM Ericsson (publ), Stockholm (SE)

(72) Inventors: Stefan Håkansson, Hisings Backa (SE); Göran Eriksson, Norrtälje (SE); Magnus Westerlund, Upplands Väsby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 418 days.

(21) Appl. No.: 16/337,150

(22) PCT Filed: Sep. 28, 2016

(86) PCT No.: PCT/SE2016/050917
§ 371 (c)(1),
(2) Date: Mar. 27, 2019

(87) PCT Pub. No.: WO2018/063041
PCT Pub. Date: Apr. 5, 2018

(65) Prior Publication Data
US 2020/0036703 A1     Jan. 30, 2020

(51) Int. Cl.
*H04L 67/02* (2022.01)
*H04W 12/069* (2021.01)
*H04L 9/40* (2022.01)

(52) U.S. Cl.
CPC .......... *H04L 67/02* (2013.01); *H04L 63/0815* (2013.01); *H04L 63/0823* (2013.01); *H04L 63/0876* (2013.01); *H04W 12/069* (2021.01)

(58) Field of Classification Search
None
See application file for complete search history.

(56) References Cited

U.S. PATENT DOCUMENTS

| 2015/0033300 A1* | 1/2015 | Timariu | H04L 65/1069 726/5 |
| 2015/0280963 A1* | 10/2015 | Bollapalli | H04L 12/5692 709/227 |

(Continued)

FOREIGN PATENT DOCUMENTS

| CN | 103546442 A | 1/2014 |
| CN | 104065717 A | 9/2014 |

(Continued)

OTHER PUBLICATIONS

Rescorla. "WebRTC Security Architecture". Published Jun. 8, 2016. (Year: 2016).*

(Continued)

*Primary Examiner* — Scott B Christensen
(74) *Attorney, Agent, or Firm* — Rothwell, Figg, Ernst & Manbeck, P.C.

(57) ABSTRACT

According to a yet further aspect of the embodiments of the present invention a server 1020 configured to bind a device application to a web service is provided. The server comprises WebRTC functionality. The server is configured to receive a request for the web service from the device application, wherein communication between the server and the device application is done via https and WebRTC and the device application is configured to generate WebRTC credentials comprising a private key, certificate of the private key and a fingerprint of the certificate. The server is configured to receive the fingerprint and fingerprint generation algorithm of the certificate, store the fingerprint and fingerprint generation algorithm and associating the fingerprint with the device application, and use DTLS, providing the certificate of the device application, in combination with the stored fingerprint to identify the device application to bind the device application to the web service.

18 Claims, 10 Drawing Sheets

(56) References Cited

U.S. PATENT DOCUMENTS

| | | | |
|---|---|---|---|
| 2015/0341312 A1 | 11/2015 | Ezell et al. | |
| 2015/0350198 A1* | 12/2015 | Li | H04L 9/3265 713/156 |
| 2016/0173464 A1* | 6/2016 | Wang | H04L 67/02 713/171 |
| 2016/0330252 A1* | 11/2016 | Stahl | H04L 65/1046 |
| 2017/0347390 A1* | 11/2017 | Cho | H04W 80/12 |

FOREIGN PATENT DOCUMENTS

| | | |
|---|---|---|
| CN | 104067591 A | 9/2014 |
| CN | 104301107 A | 1/2015 |
| CN | 104348710 A | 2/2015 |
| CN | 105516070 A | 4/2016 |
| WO | 2015/038722 A1 | 3/2015 |

OTHER PUBLICATIONS

"Online Tracking." Posted at <https://www.consumer.ftc.gov/articles/0042-online-tracking> on Jun. 2016. (Year: 2016).*

International Search Report and Written Opinion issued in International Application No. PCT/SE2016/050917, dated May 22, 2017, 9 pages.

Rescorla, E. "WebRTC Security Architecture", draft-ietf-rtcweb-security-arch-12, RTFM, Inc., Jun. 8, 2016, 43 pages.

Alvestrand, H., "Real Time Protocols for Browser-based Applications", draft-ietf-rtcweb-overview-15, Google, Jan. 21, 2016, 20 pages.

Bergkvist, A. et al., "WebRTC 1.0: Real-time Communication Between Browsers", W3C Editor's Draft 13, Sep. 2016, 162 pages.

Willem De Groef et al., "Ensuring endpoint authenticity in WebRTC peer-to-peer communicaton", Proceedings of the 31st Annual ACM Symposium on Applied Computing, New York, New York, Apr. 4, 2016 (pp. 2103-2110).

* cited by examiner

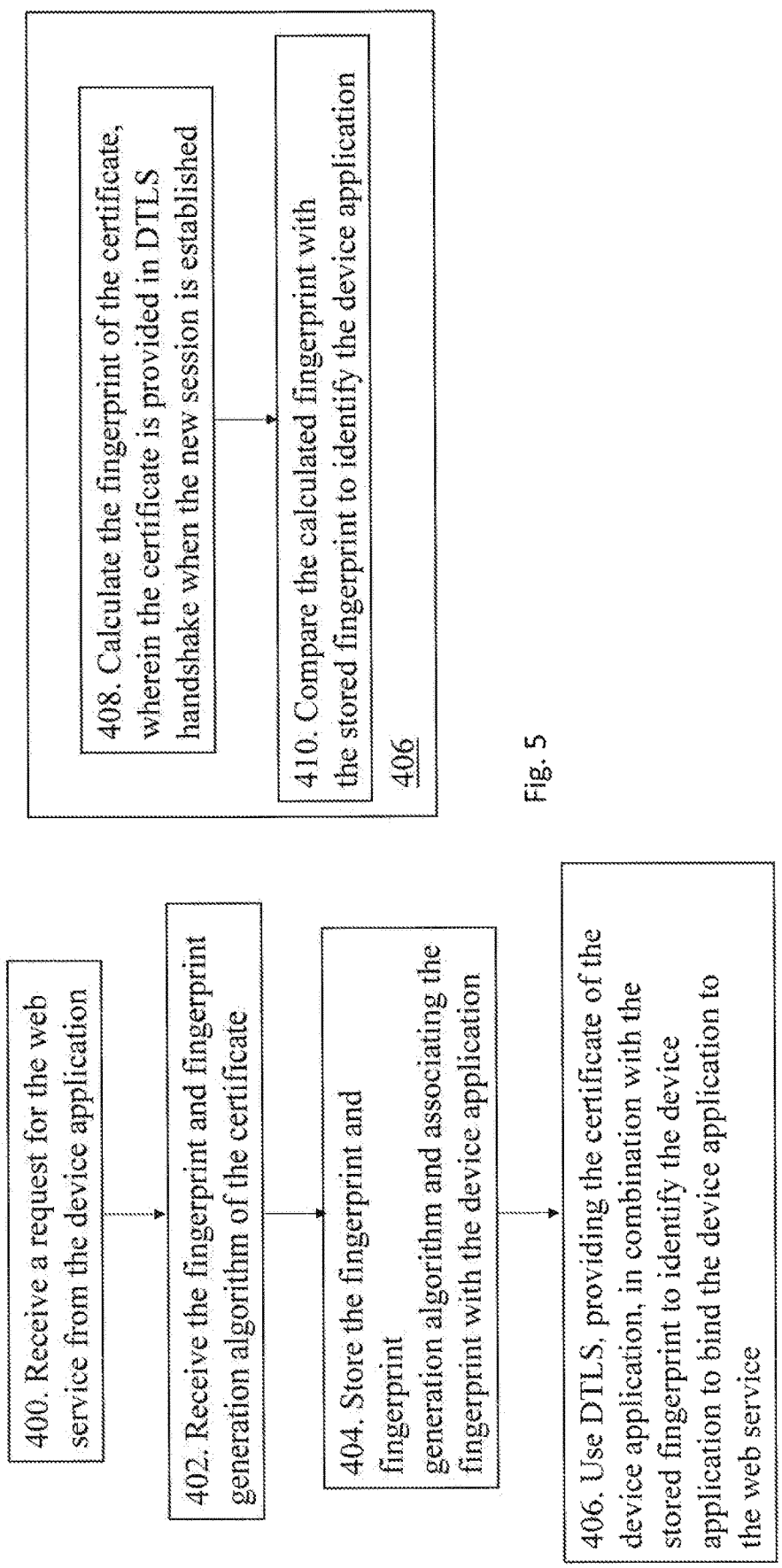

METHODS AND ARRANGEMENTS FOR BINDING A DEVICE APPLICATION TO A WEB SERVICE

CROSS REFERENCE TO RELATED APPLICATION(S)

This application is a 35 U.S.C. § 371 National Stage of International Patent Application No. PCT/SE2016/050917, filed Sep. 28, 2016, designating the United States.

TECHNICAL FIELD

The embodiments relate to methods, device application and servers for binding a device application to a service.

BACKGROUND

The embodiments target the area of enabling a service provider to identify a specific device/user accessing the service from a web browser (also referred to as a browser). This is a common requirement from the service provider perspective, and there are multiple reasons for this. For example
- to recognize a returning user in order to facilitate for the user (by remembering e.g. a shopping cart that has not been checked out, or provide info like "you recently looked at these items")
- to avoid forcing a returning user to log in again.

There can also be other reasons, like DRM (Digital Rights Management) where the permission to play content is bound to a specific device. As an example, some streaming providers keep track of the devices used to access the service, and no more than a certain amount of devices are permitted.

Different techniques are used by service providers to keep track of end users and the devices they use. Most common is the use of http cookies, but e.g. web storage can also be used.

For avoiding having to log in again when returning the browser's functionality to store username and password is usually used.

Often an email address is required as part of the user supplied credentials, and a mail of the type "respond to this mail to confirm" is sent out to verify at registration and account creation with the service provider.

A cookie (also referred to as HTTP cookie, web cookie, Internet cookie, browser cookie) is a small piece of data sent from a website and stored in the user's web browser while the user is browsing. Cookies were designed to be a reliable mechanism for websites to remember stateful information (such as items added in the shopping cart in an online store) or to record the user's browsing activity (including clicking particular buttons, logging in, or recording which pages were visited in the past). They can also be used to remember arbitrary pieces of information that the user previously entered into form fields such as names, addresses, passwords, and credit card numbers.

Other kinds of cookies perform essential functions in the modern web. Perhaps most importantly, authentication cookies are the most common method used by web servers to know whether the user is logged in or not, and which account they are logged in with. Without such a mechanism, the site would not know whether to send a page containing sensitive information, or require the user to authenticate themselves by logging in. The security of an authentication cookie generally depends on the security of the issuing website and the user's web browser, and on whether the cookie data is encrypted. Security vulnerabilities may allow a cookie's data to be read by a hacker, used to gain access to user data, or used to gain access (with the user's credentials) to the website to which the cookie belongs (see cross-site scripting and cross-site request forgery for examples).

The tracking cookies, and especially third-party tracking cookies, are commonly used as ways to compile long-term records of individuals' browsing histories—a potential privacy concern that prompted European and U.S. law makers to take action in 2011. European law requires all websites targeting European Union member states gain "informed consent" from users before storing non-essential cookies on their device Web Storage is a web application API used for handling the storage of data in a web browser. Web Storage supports persistent data storage, similar to cookies but with an enhanced capacity and no information stored in the HTTP request header. There are two main web storage types: local storage and session storage, behaving similarly to persistent cookies and session cookies respectively.

Regulation requires sites to have users explicitly accept the use of cookies, which is a hindrance. Also, getting access to the exact content of each cookie is pretty simple, which opens up for ways to fool the origin by the end user. Cookies are also vulnerable to cross-site request forgery (CSRF).

That regulation requires sites to have users explicitly accept the use of cookies is problematic from a user experience perspective.

Also, getting access to the exact content of each cookie is pretty simple, which opens up for ways for the end user to fool the service provider (by modifying cookie(s)).

Cookies are also vulnerable to cross-site request forgery (CSRF).

Web Storage is vulnerable to cross-site scripting (XSS) attacks and is generally seen as much less safe than Cookies (but do not suffer from the usability problem of having to have the user accept the use of cookies). This is one reason why cookies is the dominant solution used today.

Many users hesitate to check the "remember me on this device" box.

Having to open the mailbox and respond to confirm is a hassle.

SUMMARY

It is an objective with embodiments of the invention to achieve an improved solution for verification and reconnection to a web service.

According to a first aspect of the present invention, a method for a server to bind a device application to a web service is provided. WebRTC functionality is provided to the server. In the method a request for the web service is received from the device application, wherein communication between the server and the device application is done via https and WebRTC and the device application has generated WebRTC credentials comprising a private key, certificate of the private key and a fingerprint of the certificate. The method further comprises receiving the fingerprint and fingerprint generation algorithm of the certificate, storing the fingerprint and fingerprint generation algorithm and associating the fingerprint with the device application, and using DTLS, providing the certificate of the device application, in combination with the stored fingerprint to identify the device application to bind the device application to the web service.

According to a further aspect of the embodiments of the present invention, a method for a device application to bind the device application to a web service is provided. The method comprises requesting the web service from a primary server, receiving logic that instructs to start a web service session with the primary server with Web Real Time Control, WebRTC, and to generate WebRTC credentials comprising a private key, certificate of the private key, and a fingerprint of the certificate, generating the WebRTC credentials, and storing the private key and the certificate. The method further comprises the steps of sending the fingerprint to the primary server, and establishing a connection with the primary server using the generated WebRTC credentials.

According to a further aspect, a method for a secondary server to deliver a web service to a device application is provided. The device application being verified by a primary server, wherein WebRTC functionality is provided to the primary and the secondary server. In the method, a request to generate WebRTC credentials is received. The WebRTC credentials comprise a private key, certificate of the private key and a fingerprint of the certificate. In the method, the WebRTC credentials are generated, fingerprints are exchanged with the device application via the primary server, assistance from the primary server is obtained to identify the device application, and a connection between the device application and the secondary server is established.

According to a further aspect a server configured to bind a device application to a web service is provided. WebRTC, functionality is provided to the server and the server is configured to receive a request for the web service from the device application, wherein communication between the server and the device application is done via https and WebRTC and the device application is configured to generate WebRTC credentials comprising a private key, certificate of the private key and a fingerprint of the certificate. The server is further configured to receive the fingerprint and fingerprint generation algorithm of the certificate, store the fingerprint and fingerprint generation algorithm and associating the fingerprint with the device application, and use DTLS, providing the certificate of the device application, in combination with the stored fingerprint to identify the device application to bind the device application to the web service.

According to further aspect, a device application configured to bind the device application to a web service is provided. The device application is configured to request the web service from a primary server, to receive logic that instructs to start a web service session with the primary server with WebRTC, and to generate WebRTC credentials comprising a private key, certificate of the private key, and a fingerprint of the certificate. The device is further configured to generate the WebRTC credentials, to store the private key and the certificate, to send the fingerprint to the primary server, and to establish a connection with the primary server using the generated WebRTC credentials.

According to a yet further aspect a secondary server configured to deliver a web service to a device application is provided. The device application being verified by a primary server, wherein WebRTC, functionality is provided to the primary and the secondary server, the secondary server is configured to receive a request to generate WebRTC credentials comprising a private key, certificate of the private key and a fingerprint of the certificate. The secondary server is configured to generate the WebRTC credentials, exchange fingerprints with the device application via the primary server, obtain assistance from the primary server to identify the device application, and establish a connection between the device application and the secondary server.

Advantages with the embodiments are:
Less intrusive for the end user, since there is no need to approve the use of cookies.
Much higher security in identifying the browser/end-user device for the service provider.
Hence, according to the embodiments, a system for content delivery is achieved having the following characteristics:
It is built on web technologies, where the clients being based on web browsers.
It is completely controlled by the web site origin. In contrast to cookies, there are no possibilities for modification (fraud).
It has cryptographically bound identification of clients and possibly also other entities like CDN servers without the need for the end user to accept cookies.
It as encrypted communication (through the use of TLS or DTSL).
The system avoids cross-origin problems (i.e. the browser would be hesitant about accepting content from another origin) by the use of WebRTC for communication.
There are possibilities for a service provider to use a third party CDN provider to deliver content in a secure way without having to give access in any way to crypto data like private encryption keys.

BRIEF DESCRIPTION OF THE DRAWINGS

FIG. 4-9 are flowcharts illustrating the methods according to embodiments of the present invention.

DETAILED DESCRIPTION

Figure 1:
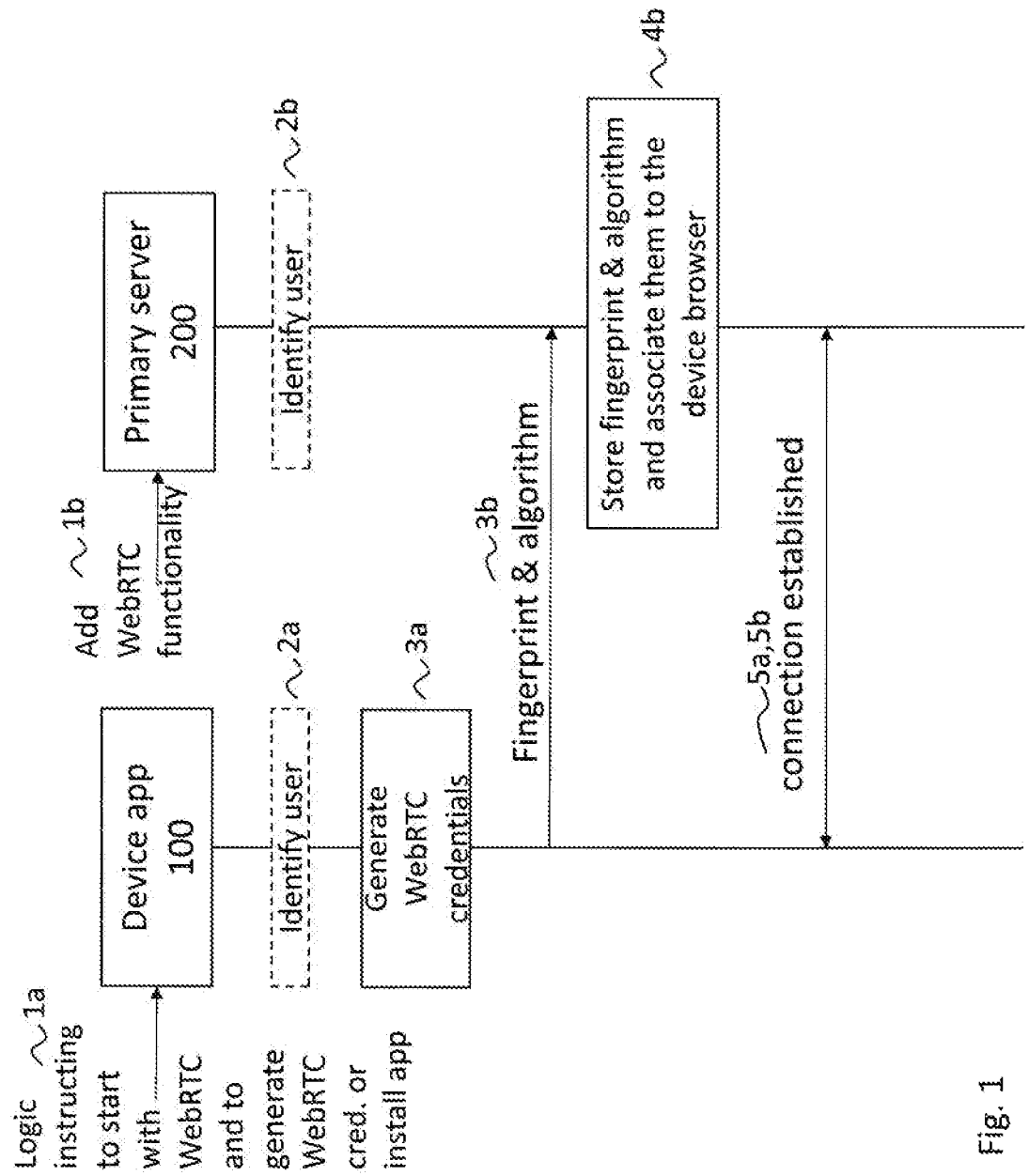
FIG. 1-3 are sequence diagram illustrating methods according to embodiments of the present invention.

The embodiments of the present invention relate to methods and arrangements for binding a device and/or a user to a web service. That is achieved by using WebRTC (Web Real-time Communication) credentials and WebRTC communication in an inventive way.

WebRTC comprises APIs (Application programming Interface) that provide means for secure communication of data blocks (which in turn can carry basically anything, including web page content and video) as well as real-time audio and video. The existing use of WebRTC is peer-to-peer communication between browsers.

The WebRTC stack depends on DTLS (Datagram Transport Layer Security) for securing the communication. The peers (end-points, browsers) use a locally generated key-pair (private key+certificate/public key), and the fingerprint for the certificate/public key is made available for transport out of band as a means of making sure that the other end-point who DTLS communication is established with is in fact the intended one. In this specification, the certificate is the public key with meta data and the fingerprint is the result of an algorithm such as a hash algorithm e.g. SHA-256 run over the certificate.

Once WebRTC communication with DTLS is established and verified by means of the private and public key pairs, WebRTC offers communication of data as well as real-time audio and video communication between browsers.

In terms of browser APIs, WebRTC provides APIs to (which are relevant for the embodiments of the present invention):

Generate a new PrivateKey+Certificate combination for use with DTLS. The Javascript object representing the Certificate also holds an expiry field as well as information about fingerprint generation algorithm(s) as well as the fingerprint(s) for the certificate.

Control which (of the generated ones) PrivateKey+Certificate combination that is being used for communication.

An API for input and output of Certificate fingerprint. The local fingerprint is output from the browser to the application as part of the DTLS connection establishment, and likewise the remote fingerprint must be provided to the browser.

Communication will only be allowed if both fingerprints match. If they don't match, the browser will stop sending and receiving data on the WebRTC channel.

It can also be noted that the embodiments of the present invention are not limited to usage in clients executing in a browser. It can also be used in e.g. native applications or clients implementing WebRTC. Further, to some extent this specification is written assuming the APIs of WebRTC 1.0, but is not limited to that. All concepts can be brought over to later versions of WebRTC, or API's intended to expose similar functionality in a similar way.

The embodiments of the present invention relate to servers, device applications and methods thereof to bind a device application to a web service, wherein Web Real Time Control, WebRTC, functionality is provided to the servers. The device application is an application in a client and is exemplified by a web browser (also referred to as a browser) or a native application. The device application can be pre-installed in a client or downloadable by the user to a client.

According to embodiments of the present invention the following steps are performed by the device application 100, e.g. a web browser or a native application when connecting to a web service provided by a primary server 200 as illustrated in FIG. 1:

1a. If the embodiments are implemented in a browser: The device application (i.e. the browser) receives logic that instructs to start the initial session with the primary server with WebRTC and to generate WebRTC credentials. The WebRTC credentials comprise the private key, the certificate (which is basically the public key with some meta data comprising at least the expiry date) and the fingerprint of the certificate. The key generation algorithm and the fingerprint generation algorithm could also be considered to be included in the WebRTC credentials.

If the embodiments are implemented in a native application: The native application is downloaded and installed, where the installation may include a configuration instruction to use WebRTC as described above.

2a. Identify the user or the device towards the server. (Optional step)

3a. Generate WebRTC credentials, i.e. private key plus public key (certificate) and fingerprint. Store the credentials.

4a. Send the fingerprint as well as information of the fingerprint generation algorithm used to generate the fingerprint to the primary server. The primary server stores the fingerprint and fingerprint generation algorithm for future verification. Additional data, which is associated with the fingerprint could also be sent to, and stored by, the primary server. Example of such data is the certificate expiration date which may be accessible from the browser APIs. This step may also be performed simultaneously with the next step.

5a. Establish a WebRTC connection with the primary server using the generated keys, wherein the establishment includes a DTLS handshake. The server calculates the fingerprint (using the algorithm received in step 4.) of the device application certificate used by the device application in the DTLS handshake and compares it to the fingerprint received in step 4a. If the fingerprints match, the device application is identified. This prevents compromises above the browser API from impersonating the compromised device which would be the case if only the logic reported the fingerprint of the devices WebRTC credentials.

Figure 3:
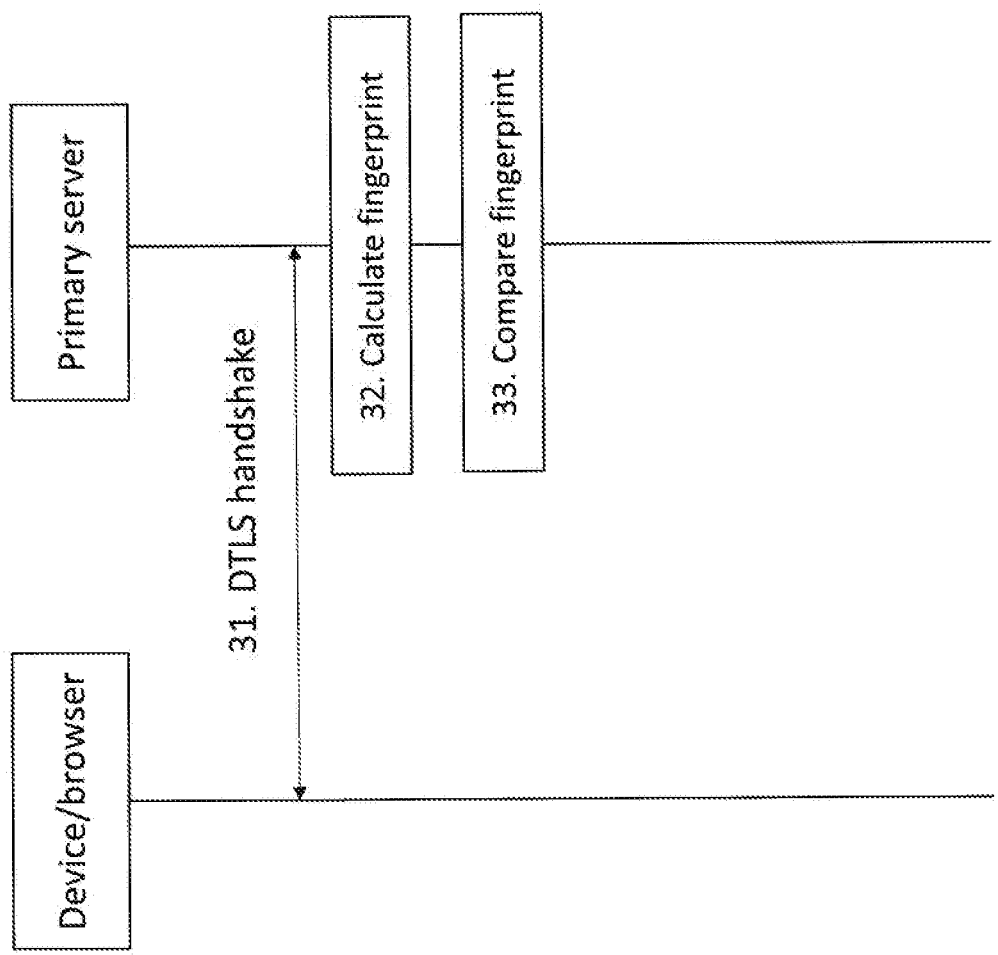

Whenever a new session is started, WebRTC communication between the device application and the server is established, and the server verifies that the certificate used by the device application in the DTLS handshake 31 is the right one by calculating 32 the fingerprint used in the DTLS handshake and comparing 33 it to the one sent by the device application in step 4a above which is illustrated in FIG. 3.

Figure 2:
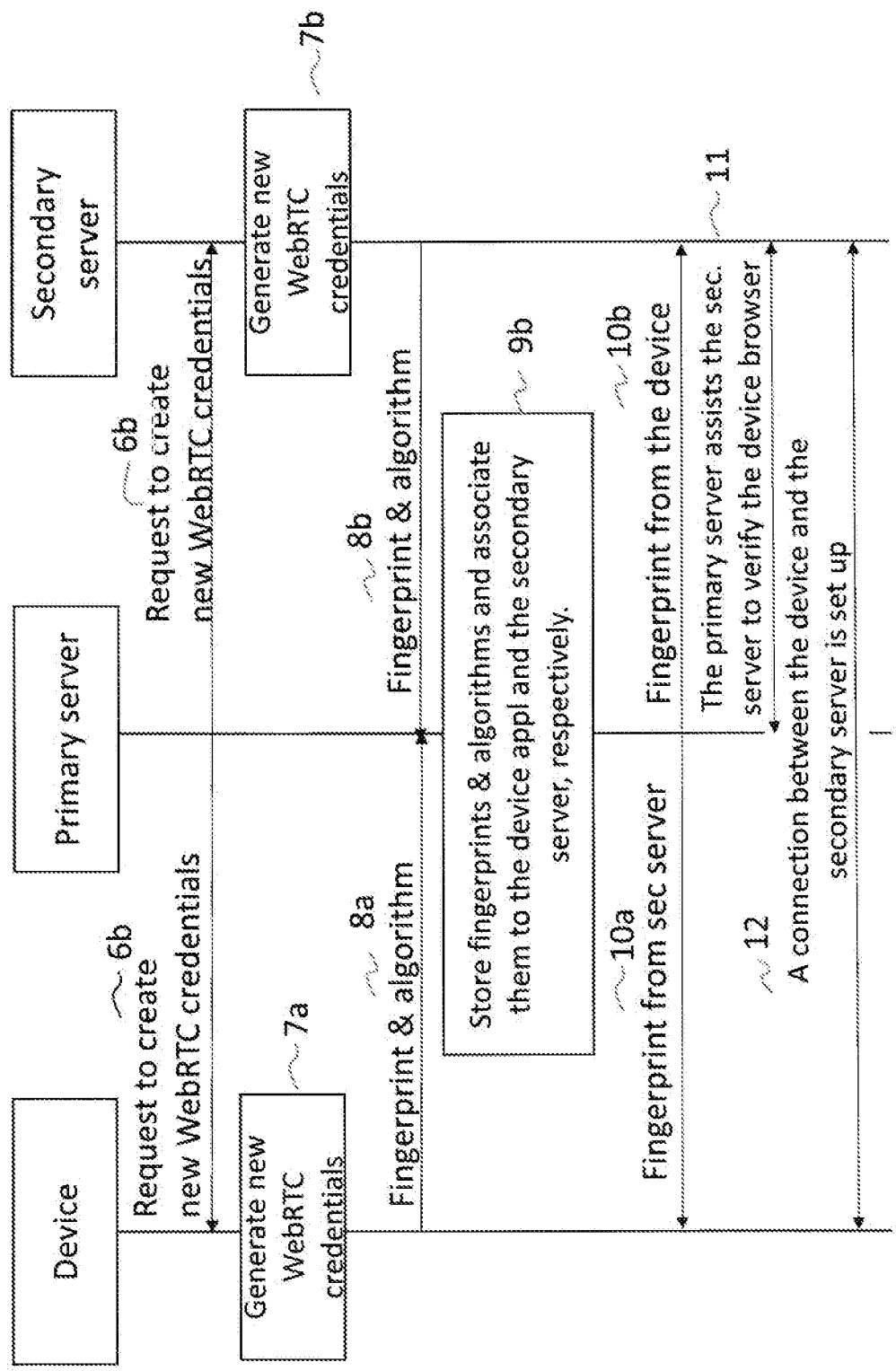

When the content is delivered from a 3rd party server, also referred to as secondary server, the following additional steps are performed by the device application, e.g. the browser, as illustrated in FIG. 2. The primary server provides the device application with information to fetch resources from a secondary server, and which WebRTC credentials (fingerprints) to append to the fetch requests to a secondary server, or the device application can realize that on its own. The information includes the fingerprints, secondary server addresses and metadata guiding the device in the process of using the secondary server such as fallback server, timing, locality, etc.

The device application appends the proper WebRTC credentials to the request to the secondary server, e.g. HTTP headers or by establishing an WebRTC peer connection with the security credentials to exchange the necessary information or security tokens used to authorize the requests after verification.

Thus, the device application performs the following steps to be verified by the secondary server.

6a. Receive a request to generate new WebRTC credentials.

7a. Generate new WebRTC credentials, i.e. private key/ public key (certificate) and the fingerprint of the certificate.

8a, 8b,9b,10a,10b. Send the fingerprint of the new WebRTC credentials (along with fingerprint generation algorithm and possibly other meta data) of the new certificate to the primary server. The primary server if not worried about compromises of above browser API can store this new fingerprint as used with a secondary server for this device application. If the primary server wants to protect against compromises above the API, then the primary server needs to verify that the new WebRTC credentials the fingerprint relates to comes from the same device application as the first ones. This verification can be done is several ways, such as cryptographically prove the relation by using trusted credentials, e.g. the first WebRTC credentials, to sign the new credentials, or use an trusted identity provider to sign also these credentials, use HTTP headers to have the trusted part of the client device, e.g. the HTTP layer in the browser, include the fingerprint in a request to primary, or rely on indication by having the device application first establish a WebRTC connection with the primary and configuration information such as addresses. When this binding has been established and the fingerprint for the new credentials are stored, the primary server forwards the fingerprint data (fingerprint and fingerprint generation algorithm) to the secondary server from the device application and the fingerprint data from the secondary server to the device application.

11,12. Accessing the secondary server where the secondary server verifies the device application with assistance of the primary server.

According to embodiments of the present invention the following steps are performed by the primary server:

1b. WebRTC functionality is added to the primary server.
2b. Identify the user or the device. This is an optional step.
3b. Receive fingerprint data from the device application.
4b. Store the fingerprint and associate the received fingerprint with the device application.
5b. Establish WebRTC connection with the device application.

Whenever a new session is established (FIG. 3): 32. Calculate the fingerprint of the client certificate used in the DTLS handshake 31. 33. Compare the calculated fingerprint with the stored fingerprint (i.e. verify that the right certificate is used).

When the content is delivered from a 3rd party server (denoted secondary server), additional steps are performed at the primary server. The primary server provides the device application with information to fetch resources from a secondary server and which WebRTC credentials (fingerprints) to append to the fetch requests to a secondary server. The information includes the fingerprints, secondary server addresses and metadata guiding the device in the process of using the secondary server such as fallback server, timing, locality, etc.

The following steps are performed by the primary server to be able to access the secondary server.

6b. Request the device and the secondary server to generate new WebRTC credentials, i.e. private key and public key/certificate as well as certificate fingerprint. New WebRTC credentials are generated at the device and the secondary server 7a,7b.
8b. Receive the fingerprint (and fingerprint generation algorithm) of new generated WebRTC credentials.
9b. The new WebRTC credentials are associated with the device and secondary server, respectively and the new WebRTC fingerprint and fingerprint generation algorithms generated by the device application are forwarded to the secondary server by the primary server and the fingerprint data generated by the secondary server is forwarded by the primary server to the device application. The primary server may need to verify that the new WebRTC credentials the fingerprint relates to comes from the same device application as the first ones as discussed above.
10b. Assisting the 3$^{rd}$ party server to identify the device towards the 3$^{rd}$ party server.
11b. A WebRTC connection between the device and the secondary server is set up.

According to an embodiment, a service is to be delivered to the end user via a device application such as a web browser. The communication between the web browser and the server providing the service is achieved over http using TLS (Transport Layer Security) (e.g. https (HyperText Transfer Protocol Secure) using TLS).

At the initial use of the service, the user may somehow identify her/himself. The identification may be performed by using a valid credit card to make a payment, or by creating a log in (e.g. username/password), maybe adding an email confirmation step. Also, at the initial use, the user's application, e.g. a web app running in the web browser on a smartphone or tablet uses the WebRTC APIs to a) generate new WebRTC credentials, i.e. PrivateKey+Certificate/public key combination including certificate fingerprint and b) establish a WebRTC communication to the server using these credentials. At the server side, the fingerprint of the certificate is stored which is provided by the user's web app over https to the server. In parallel, the WebRTC credentials are automatically stored in a safe persistent storage associated in the browser. The fingerprint will be used to identify the browser. It should be noted that when the browser is verified, also the device is being verified, since another browser instance would have other credentials, regardless of being on the same device or another device.

Each time the browser is again used to access the service, provided that the certificate is still valid, a WebRTC connection is established which is using the stored key combination; with the additional validation that the fingerprint of the certificate used by the client when establishing the connection matches the fingerprint stored at the server.

To realize the above described embodiments, the following new components need to be added to a default https based service where it is assumed that the end user uses a WebRTC capable browser to access the service provided by the primary server:

WebRTC functionality must be added to the involved server(s).

The application logic, which is transferred to the device application e.g. in the form of html and javascript, must be changed to instruct the device application to, in the first session use WebRTC to generate WebRTC credentials and for every session, including the first session, to establish a WebRTC connection that uses said PrivateKey+Certificate combination. The device application logic must also send the fingerprint and fingerprint generation algorithm to the server at the first session.

The primary server must also add logic that compares the fingerprint calculated over the certificate used by the end user's device in the DTLS handshake with the stored one (this comparison is made for every session) to make sure it is the right device. The primary server may store a list of fingerprints, e.g. to allow the user to use several devices.

In this way, the device+browser can be securely identified without using cookies or forcing the user to provide credentials. Since it is cryptographically bound, the identification is much more secure than e.g. cookies. Note also that the WebRTC connection established can be used to transport content to and from the server using the WebRTC data channel, but that also the real-time audio+video of WebRTC can be used e.g. for covering a live sports event, or even reverse communication as in TV shows where viewers participate—all fall under the same securely established DTLS connection.

Some use cases where the embodiments are applicable are described below.

To Keep Track of Returning Device/User for a Service not Requiring a Log in:

This use case is applicable for many services, for example a web shop that allows users to browse and put merchandise in the shopping cart without any log in. It is also applicable for other sites to be able to adjust the content exposed based on previous action of the user. Today these services use cookies to track a returning user, and thus have to (at least in Europe) show a warning "this site uses cookies, click to accept". By using the embodiments of the present inventions where the credentials are generated by using WebRTC, this can be avoided.

Very Secure and, for User, Smooth Handling of Right to Use a Service:

Consider a service provider (e.g. service providers providing streaming services) that requires users to log on, and that limits the number of devices the end user can use to consume the service. With the embodiments described herein this will be made safer than the current state of art allows, and less intrusive for the end user:

- At the first use, the user needs to create an account and prove that she/he controls the identifier, usually this is performed according to prior art by responding to an email.
- Each time the user returns and reconnects to the web service things will just work—there is no need to log in again and provide username and password, there is no need to have the browser remember username and password, and there is no need for the user to accept cookies (or for the service provider to put in the info "this site uses cookies, click 'ok' to show that you accept").
- By using the embodiments of the present invention, the reconnection will be smoother and less intrusive for the end user, and already this has a great value since it is well known that many users go away if they have to create accounts, invent username and password, etc. However, the present invention also provides a much more secure way for the service provider to, when the user returns, make sure the device used to access the service is indeed the one that is approved.

Securely Use Third Party Such as a CDN (Content Delivery Network) without Sharing any Keys The embodiments also enable the service provider to use alternative delivery servers (referred to as secondary servers), potentially 3rd party, without sharing any keying material (which could leak), without cross-origin hassles, and still have the browser present a "green padlock" to the end user.

The proposed solution builds on leveraging the WebRTC stack and browser APIs to enable a much more secure identification of the device/client used by the end user, and possibly also the end user her/himself if the user can be securely associated to a particular deliver.

In short this comes down to using the APIs to control what Key/Certificates are used to establish a secure WebRTC communication and to verify that the correct certificate is indeed used by means of evaluating the fingerprint, said communication is then used to transfer the content to the device for rendering. There is also the possibility to use the WebRTC Identity API to establish the identity of the user.

Hence, the embodiments enable the use of WebRTC credentials for authenticating a user/device when accessing a 3rd party's servers (also referred to as secondary server) and associated services provided by a 3rd party. Note that a third party CDN is one example of a 3rd party service.

An example of the procedure for the $3^{rd}$ party servers is described above.

The above-described embodiment may be applied to HTTP cross origin requests.

In one embodiment, a user downloads a HTML application to a browser. The user initializes the applications, causing it to perform the initial login to the service provider at the primary servers. During this process, the primary server requests the browser to create one or several WebRTC credentials to the browser (or user). The HTML application receives the fingerprints and sends them to the primary server where they are associated with the browser (or user).

The primary server provides the HTML application with information to fetch resources from a secondary server (i.e. the third party server) and which WebRTC credentials (fingerprints) to append to the fetch requests to a secondary server. The information includes the fingerprints, secondary server addresses and metadata guiding the device in the process of using the secondary server such as fallback server, timing, locality, etc.

The browser appends the proper WebRTC credentials to the request to the secondary server, e.g. HTTP headers or by establishing an WebRTC peer connection with the security credentials to exchange the necessary information or security tokens used to authorize the requests after verification.

The secondary server verifies (the identity and the authority of) the browser, either by connecting to the primary server, or a server the primary server refers to, and using previously received information from the primary service provider.

It can also be noted that if the secondary server(s) use another origin than the primary server for accessing resources, using WebRTC for communication with the secondary ($3^{rd}$ party) server avoids cross-origin related signaling (pre-flight messages) and approval that would be part of normal http requests where done. Thus, the use of WebRTC for communication with the servers avoid the cross-origin problems. Cross-origin refers to when a resource requests a resource from a different domain than the one which the first resource itself serves. Many web pages load resources like images, scripts from separate domains. Due to security reasons, some of these cross-origin requests are restricted.

A pre-requisite of the embodiments is that the device application and the primary server have established trust and are cryptographically bound as explained above using the WebRTC APIs. The service can then uniquely identify the device application for each session and make sure only content the device application (the user) is entitled to is delivered.

As mentioned above, the primary server may prefer to use third party servers (also referred to as secondary servers, e.g. CDN) to deliver a part of the content. This can be done in a secure way as described above.

Thus, communication between the device application (e.g. the browser) and the primary server as well as between the device application (e.g. the browser) and the secondary server is performed by WebRTC. Further, the primary server is the orchestrator of the WebRTC connection(s) between the device and the secondary server meaning that the WebRTC sessions descriptions including certificate fingerprints and certificate fingerprint generation algorithms are exchanged via the primary server.

The primary server asks the device application (browser) as well as the secondary server to generate a key+certificate pair for this specific session and asks them to deliver certificate fingerprints. Alternatively, the key+certificate pair to be used by the secondary server could be provided by another entity.

Since the solution according to some embodiments is based on that a direct WebRTC connection is used also between the device application and the secondary server, both of them needs to generate new WebRTC credentials. The credentials include private key, certificate, as well as fingerprint of the certificate and fingerprint generation algorithm. The secondary server may accomplish that in different ways, it is up to the implementation.

On the device application side, the web application (html/javascript comprising instructions to use WebRTC) could be provided by the primary server, and the web application uses WebRTC APIs in the browser to generate the WebRTC credentials.

The secondary server and the device application establishes a WebRTC connection using these credentials by exchanging WebRTC session descriptions via the primary server. The session descriptions comprise configuration information needed to establish a WebRTC peer connection between the device and the secondary server. The certificate fingerprint and certificate fingerprint generation algorithm are also included in the session descriptions.

The primary server stores the fingerprint data. Before storing the fingerprints, the primary server may verify that the certificate to be used with the secondary server originates from the same device instance as the certificate used with the primary server as discussed above.

At each subsequent session the WebRTC communication between the device application and the secondary server done by exchanging the WebRTC session descriptions via the primary server. Before forwarding the session descriptions the primary server inspects the fingerprints, and if they do not match the stored fingerprints the session descriptions are not forwarded and thus communication with the secondary server is not established.

Thus, bootstrapped via the already described cryptographically bound identification between primary server and the device application, a likewise cryptographically bound session can be set up between the secondary server and the device application under control of the primary server without the primary server in any way having to give the secondary server access to any origin key material used between the device and the primary server.

Therefore, the primary server can encrypt all resources delivered via the secondary server (e.g. a CDN) to make the secondary server (e.g. the CDN) blind. The key (other keys than the WebRTC credentials) needed by the device application to decrypt resources delivered by the secondary server (e.g. the CDN) can be delivered to the device application directly from the primary server.

The communication between the primary server and the secondary server must be secure in this setup. How it is done is not within the scope of the present invention, but that could be accomplished in a similar way to how the primary server and the device communication is set up. Note that key(s) needed to decrypt content would typically not be shared with the secondary server. Other options exist as well.

It should be noted that the examples above include one single secondary server, but it is trivial to extend the solution to multiple secondary servers.

The WebRTC may only be used to bind the browser/device/client (i.e. to authenticate) towards the secondary server. Subsequent content delivery may be achieved over e.g. https. The binding between WebRTC and https may be done e.g. by a shared secret on web application level, or by the http protocol using a dedicated response header.

WebRTC has also a solution for allowing (potentially a third) a party to provide an identity. This can be used in combination with the above. Hence, the WebRTC function to allow a party to provide an identity for verifying an identity each time needed is used. E.g. for the first use of the service (this is further expanded below), when the certificate has expired, or when the user has cleared all data in browser. In this way, steps like inventing new usernames and passwords can be avoided, and likewise can things like "respond to email to activate account" and so on.

Even though the embodiments described above relies on WebRTC, there is no absolute need to use WebRTC for delivering the data associated with using the service for a session. WebRTC can be used to establish trust at start of a session, but subsequent content delivery could be made via for example https. One way of authorizing the client for further HTTPS and Web socket data request is that the server provides the client over the PeerConnection with a short term session token that authorize those requests.

To avoid email confirmation and simplifying service registration simplifies for the end user to register for service subscription. As has been mentioned earlier, for services requiring a registration, there is an initial phase where the user has to provide some data including an email address, and the service will not be delivered until the user has responded to an email.

WebRTC, in addition to what has been mentioned before, also has APIs and functionality related to allowing an Identity Provider to provide identity assertion of the user. By using this in the first session the service provider can avoid email confirmation, either by trusting a third party Identity Provider or by establishing its own Identity Provider service.

Figure 6:
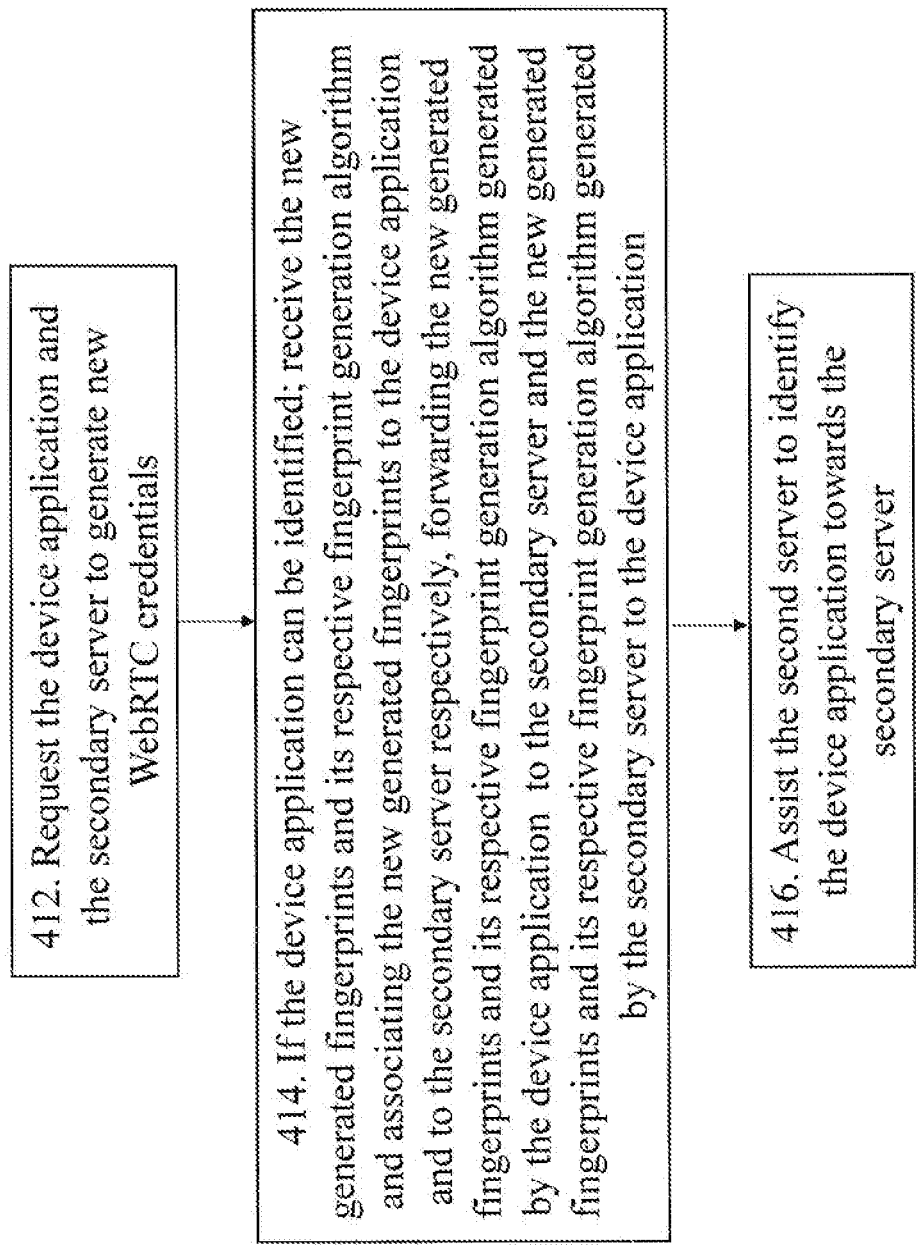

Different embodiments of the invention are described above. According to one aspect as illustrated in the flow-charts of FIG. 4-6, a method for a server to bind a device application to a web service is provided and WebRTC functionality is provided to the server. According to an embodiment, the method comprises:

400. Receive a request for the web service from the device application, wherein communication between the server and the device application is done via https and WebRTC and the device application has generated WebRTC credentials comprising a private key, certificate of the private key and a fingerprint of the certificate.

402. Receive the fingerprint and fingerprint generation algorithm of the certificate.

404. Store the fingerprint and fingerprint generation algorithm and associating the fingerprint with the device application.

406. Use DTLS, which provides the certificate of the device application, in combination with the stored fingerprint to identify the device application to bind the device application to the web service.

According to an embodiment, the step of using DTLS 406 further comprises:

408. Calculate the fingerprint of the certificate, generated by a device application establishing the new session, wherein the certificate is provided in DTLS handshake when the new session is established.

410. Compare the calculated fingerprint with the stored fingerprint to identify the device application.

When content of the web service is delivered from a secondary server, the further steps are peformed:

412. Request the device application and the secondary server to generate new WebRTC credentials comprising a private key and a certificate of the private key and a fingerprint of the certificate.

414. Receive the new generated fingerprints and its respective fingerprint generation algorithm and associating the new generated fingerprints to the device application and to the secondary server respectively, forward the new generated fingerprints and its respective fingerprint generation algorithm generated by the device application to the secondary server and the new generated fingerprints and its respective fingerprint generation algorithm generated by the secondary server to the device application.

416. Assist the secondary server to identify the device application towards the secondary server.

Figure 7:
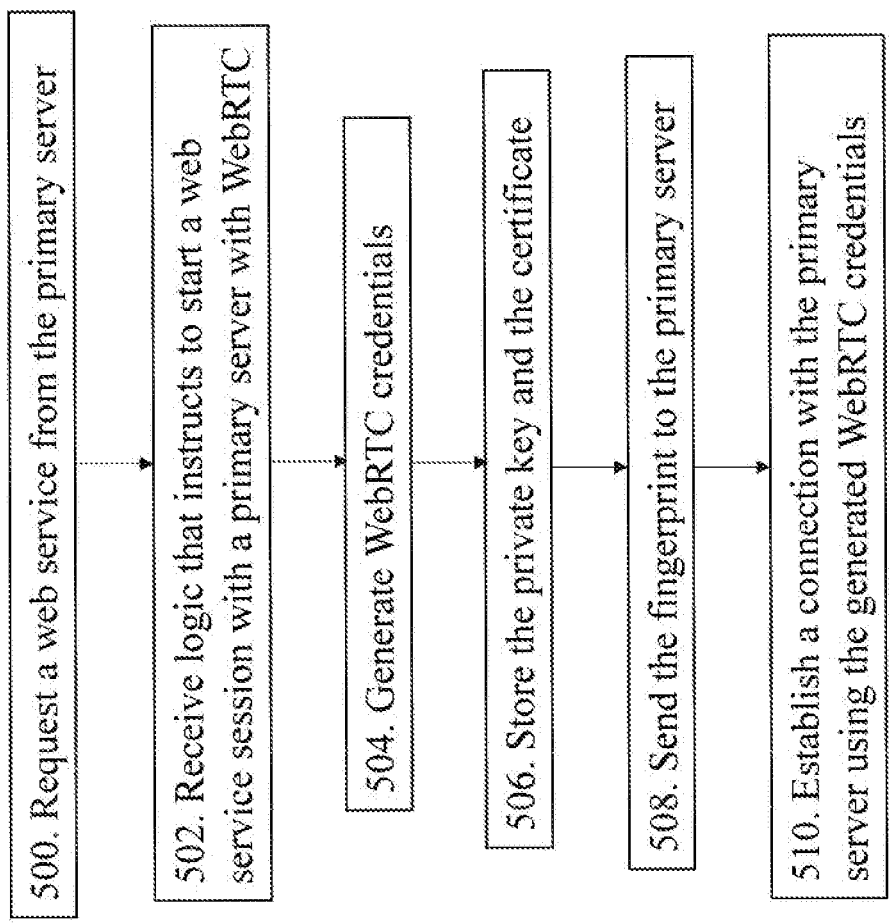
Figure 8:
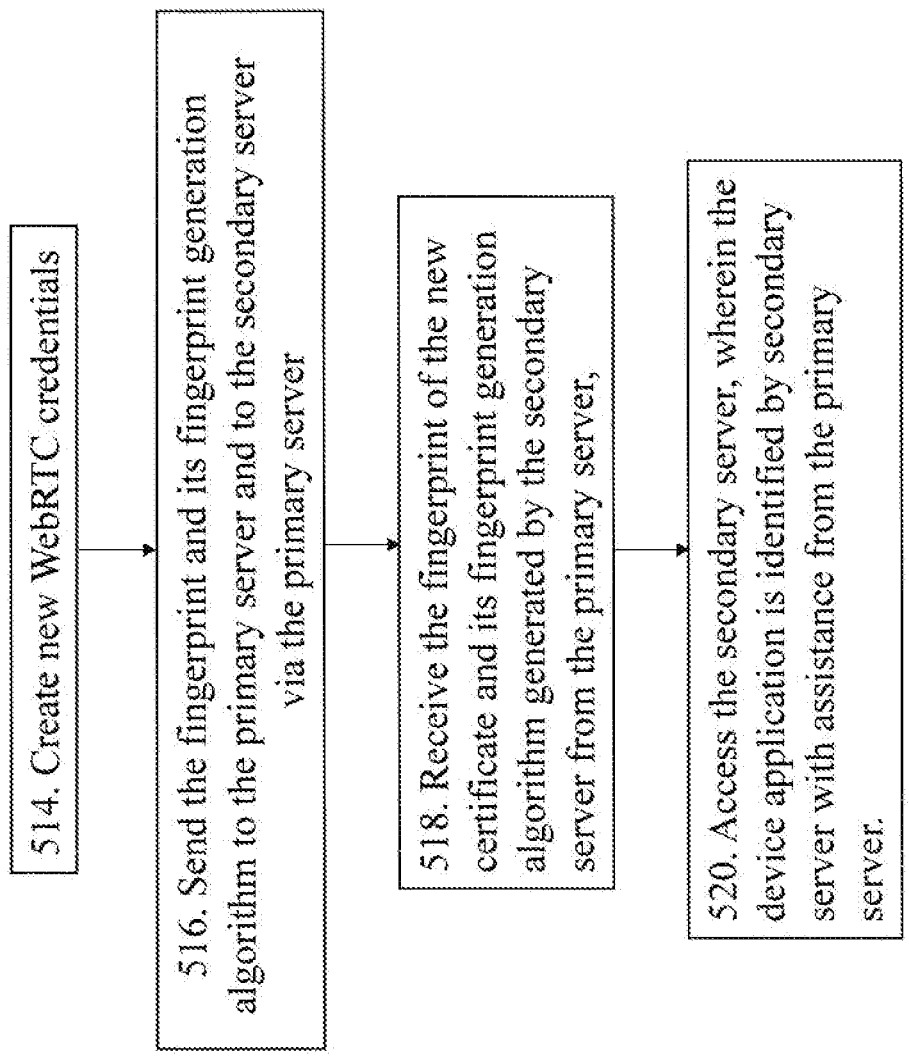

According to a further aspect of the embodiments, a method for a device application to bind the device application to a web service is provided as illustrated in the flowcharts of FIGS. 7-8. The method comprises:

500. Request the web service from a primary server.

502. Receive logic that instructs to start a web service session with the primary server with WebRT, and to generate WebRTC credentials comprising a private key, certificate of the private key, and a fingerprint of the certificate.

504. Generate the WebRTC credentials.

506. Store the private key and the certificate.

508. Send the fingerprint to the primary server,

510. Establish a connection with the primary server using the generated WebRTC credentials.

Whenever a new session with the requested web service is being established, the method comprises the further steps of:

512. Provide to the primary server the certificate in DTLS handshake when the new session is established such that the primary server can calculate the fingerprint of the certificate, and compare the calculated fingerprint with the stored fingerprint to identify the device application.

When content of the web service is delivered from a secondary server, the method comprises the further steps of:

514. Create new WebRTC credentials comprising, a private key, certificate of the private key, and a fingerprint of the certificate.

516. Send the fingerprint of the new certificate and its fingerprint generation algorithm to the primary server and to the secondary server via the primary server.

518. Receive the fingerprint of the new certificate and its fingerprint generation algorithm generated by the secondary server from the primary server.

520. Access the secondary server, wherein the device application is identified by secondary server with assistance from the primary server.

Figure 9:
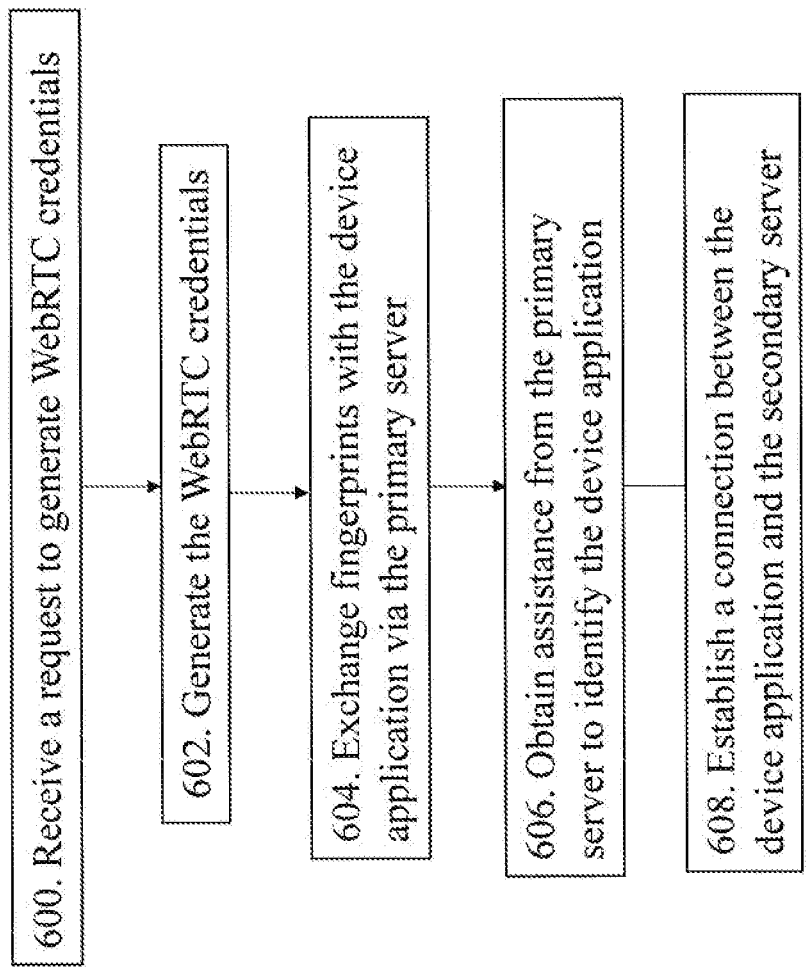

According to a yet further aspect of the embodiments of the present invention, a method for a secondary server to deliver a web service to a device application is provided according to the flowchart in FIG. 9. The device application being verified by a primary server, wherein WebRTC functionality is provided to the primary and the secondary server. The method comprises:

600. Receive a request to generate WebRTC credentials comprising a private key, certificate of the private key and a fingerprint of the certificate.

602. Generate the WebRTC credentials.

604. Exchange fingerprints with the device application via the primary server.

606. Obtain assistance from the primary server to identify the device application.

608. Establish a connection between the device application and the secondary server.

Figure 10:
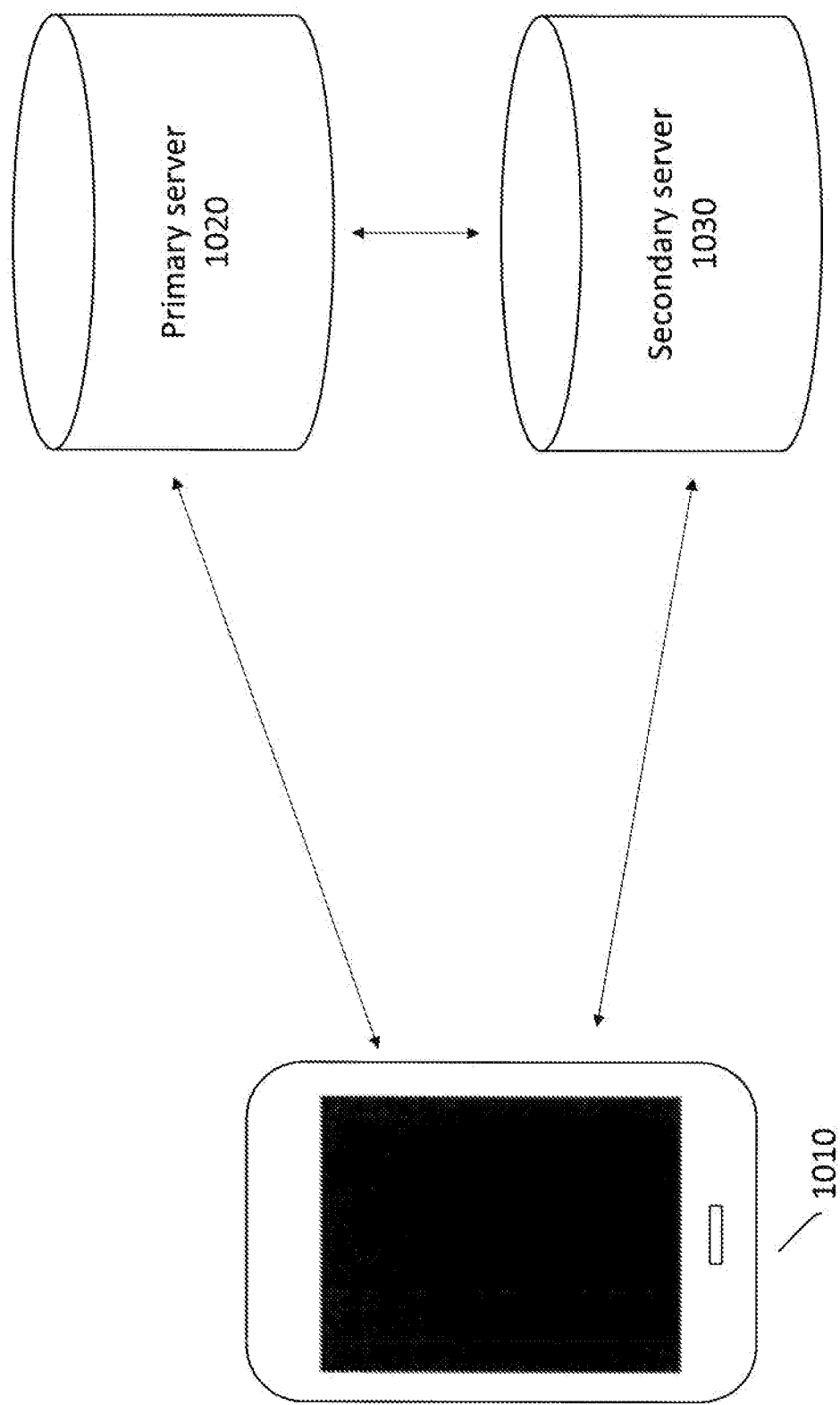
FIG. 10-11 illustrate schematically the device application, the primary server and the secondary server according to embodiments of the present invention.
Figure 11:
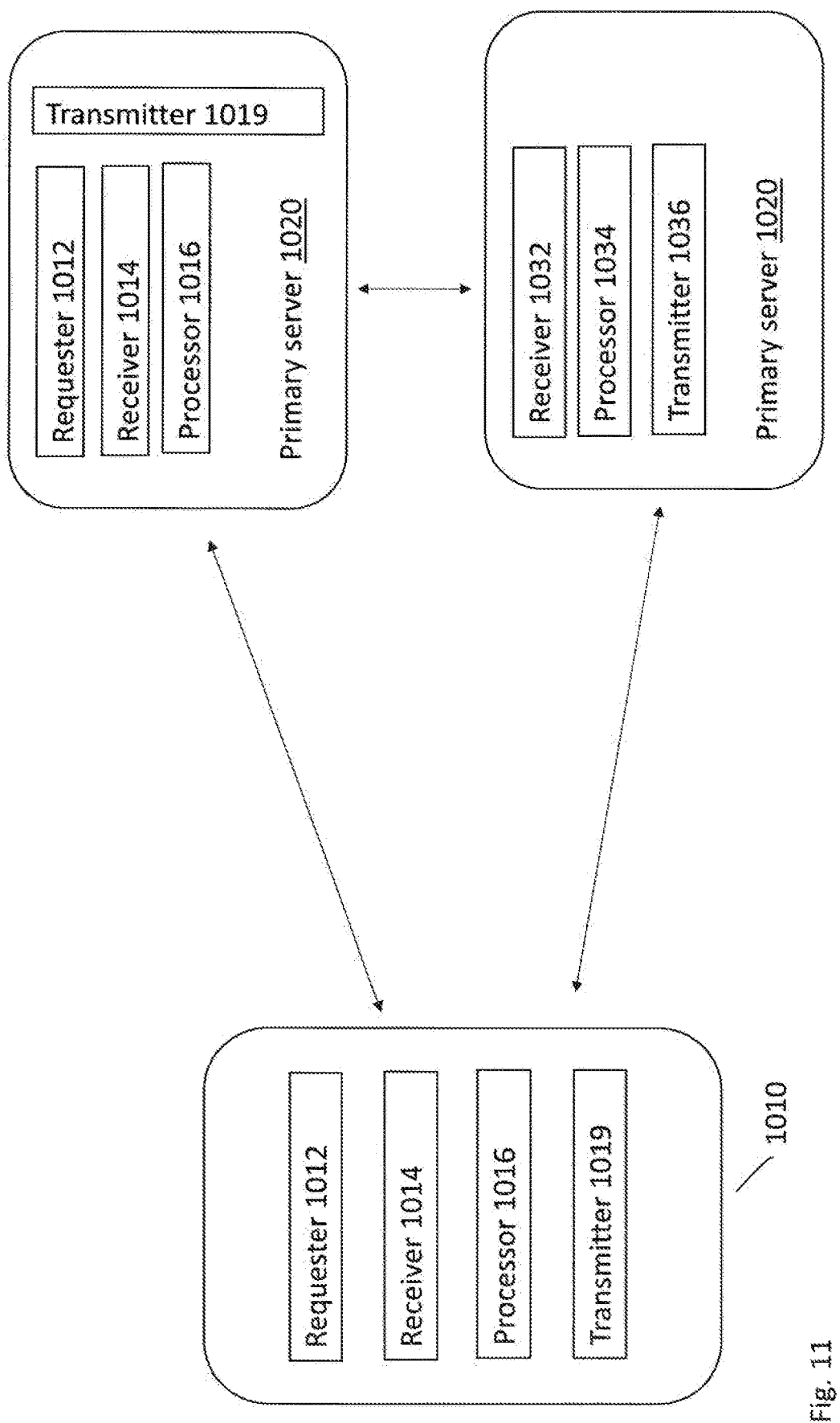

According to a yet further aspect of the embodiments of the present invention a server 1020 configured to bind a device application to a web service is provided as illustrated in FIGS. 10-11. The server comprises WebRTC functionality. The server is configured to receive a request for the web service from the device application, wherein communication between the server and the device application is done via https and WebRTC and the device application is configured to generate WebRTC credentials comprising a private key, certificate of the private key and a fingerprint of the certificate. The server is configured to receive the fingerprint and fingerprint generation algorithm of the certificate, store the fingerprint and fingerprint generation algorithm and associating the fingerprint with the device application, and use DTLS, providing the certificate of the device application, in combination with the stored fingerprint to identify the device application to bind the device application to the web service.

According to embodiments the server is further configured to calculate the fingerprint of the certificate, generated by a device application establishing the new session, wherein the certificate is provided in DTLS handshake when the new session is established, and to compare the calculated fingerprint with the stored fingerprint to identify the device application.

The server may also be configured to, when content of the web service is delivered from a secondary server, request the device application and the secondary server to generate new WebRTC credentials comprising a private key and a certificate of the private key and a fingerprint of the certificate, to receive the new generated fingerprints and its respective fingerprint generation algorithm and associating the new generated fingerprints to the device application and to the secondary server respectively. The server is further configured to forward the new generated fingerprints and its respective fingerprint generation algorithm generated by the device application to the secondary server and the new generated fingerprints and its respective fingerprint generation algorithm generated by the secondary server to the device application and assist the secondary server to identify the device application towards the secondary server.

According to one embodiment, the server 1020 comprises a receiver 1022 for receiving the request for the web service and for receiving the fingerprint and fingerprint generation algorithm of the certificate, a memory 1024 for storing the fingerprint and fingerprint generation algorithm and associating the fingerprint with the device application, and a processor 1026 for using DTLS, providing the certificate of the device application, in combination with the stored fingerprint to identify the device application to bind the device application to the web service.

The processor 1026 may also be configured to calculate the fingerprint of the certificate, generated by a device application establishing the new session, wherein the certificate is provided in DTLS handshake when the new session is established, and to compare the calculated fingerprint with the stored fingerprint to identify the device application.

The server 1020 may further comprise a transmitter 1028 for requesting the device application and the secondary server to generate new WebRTC credentials comprising a private key and a certificate of the private key and a fingerprint of the certificate, and wherein the receiver 1022 is further configured to receive the new generated fingerprints and its respective fingerprint generation algorithm and associating the new generated fingerprints to the device application and to the secondary server 1030 respectively. The transmitter 1028 is further configured to forward the new generated fingerprints and its respective fingerprint generation algorithm generated by the device application to the secondary server and the new generated fingerprints and its respective fingerprint generation algorithm generated by the secondary server 1030 to the device application and the processor is further configured to assist the secondary server 1030 to identify the device application towards the secondary server 1030.

A device application 1010 configured to bind the device application to a web service is provided. The device application 1010 is configured to request the web service from a primary server, to receive logic that instructs to start a web service session with the primary server with WebRTC and to generate WebRTC credentials comprising a private key, certificate of the private key, and a fingerprint of the certificate, to store the private key and the certificate, to send the fingerprint to the primary server, and to establish a connection with the primary server using the generated WebRTC credentials.

The device application may also be configured to, whenever a new session with the requested web service is being established, provide the primary server with the certificate in DTLS handshake when the new session is established such that the primary server can calculate the fingerprint of the certificate, and to compare the calculated fingerprint with the stored fingerprint to identify the device application.

The device application may according to another embodiment be configured to create new WebRTC credentials comprising, a private key, certificate of the private key, and a fingerprint of the certificate, to send the fingerprint of the new certificate and its fingerprint generation algorithm to the primary server and to the secondary server via the primary server, to receive the fingerprint of the new certificate and its fingerprint generation algorithm generated by the secondary server from the primary server, and to access the secondary server, wherein the device application is identified by secondary server with assistance from the primary server.

The device application may be a browser or a native application and wherein the native application is configured to receive the logic at installation of the device application.

The device application may be configured to use WebRTC identity APIs in combination with an Identity Provider to establish the identity of an end user of the device application.

The device application 1010 may comprise a requester 1012 for requesting the web service from a primary server 1020, a receiver 1014 for receiving logic that instructs to start a web service session with the primary server with WebRT, and a processor 1016 for generating WebRTC credentials comprising a private key, certificate of the private key, and a fingerprint of the certificate, a memory 1018 for storing the private key and the certificate, a transmitter 1019 for sending the fingerprint to the primary server 1020, and the processor 1016 is further configured for establishing a connection with the primary server using the generated WebRTC credentials.

The transmitter 1019 is further configured to provide the primary server 1020 with the certificate in DTLS handshake when the new session is established such that the primary server 1020 can calculate the fingerprint of the certificate, and the processor 1016 is further configured to compare the calculated fingerprint with the stored fingerprint to identify the device application 1010.

The processor 1016 may be configured to create new WebRTC credentials comprising, a private key, certificate of the private key, and a fingerprint of the certificate. The transmitter 1019 may be configured to send the fingerprint of the new certificate and its fingerprint generation algorithm to the primary server and to the secondary server 1030 via the primary server 1020, and the receiver 1014 may be configured to receive the fingerprint of the new certificate and its fingerprint generation algorithm generated by the secondary server 1030 from the primary server 1020, and the processor 1016 may be configured to access the secondary server 1030, wherein the device application 1010 is identified by secondary server 1030 with assistance from the primary server 1020.

According to a further aspect of embodiments of the present invention, a secondary server, e.g. a $3^{rd}$ party server, is provided.

The secondary server 1030 is configured to deliver a web service to a device application 1010 and the device application 1010 being verified by a primary server. WebRTC functionality is provided to the primary server 1020 and the secondary server 1030. The secondary server is configured to receive a request to generate WebRTC credentials comprising a private key, certificate of the private key and a fingerprint of the certificate, to generate the WebRTC credentials, to exchange fingerprints with the device application via the primary server 1020, to obtain assistance from the primary server 1020 to identify the device application 1010, and to establish a connection between the device application 1010 and the secondary server 1030.

The secondary server 1030 may comprise a receiver 1032 for receiving a request to generate WebRTC credentials comprising a private key, certificate of the private key and a fingerprint of the certificate, a processor 1034 for generating the WebRTC credentials, the receiver 1032 and a transmitter 1036 are configured to exchange fingerprints with the device application 1010 via the primary server 1020, the processor 1034 is further configured to obtain assistance from the primary server 1020 to identify the device application 1010, and to establish a connection between the device application 1010 and the secondary server 1030.

Yet another aspect of the embodiments relates to a computer program comprising instructions, which when executed by at least one processor, cause the at least one processor to receive a request for the web service from the device application, wherein communication between the server and the device application is done via https and WebRTC and the device application is configured to generate WebRTC credentials comprising a private key, certificate of the private key and a fingerprint of the certificate, to receive the fingerprint and fingerprint generation algorithm of the certificate, store the fingerprint and fingerprint generation algorithm and associating the fingerprint with the device application, and to use DTLS, providing the certificate of the device application, in combination with the stored fingerprint to identify the device application to bind the device application to the web service.

Yet another aspect of the embodiments relates to a computer program comprising instructions, which when executed by at least one processor, cause the at least one processor to request the web service from a primary server, to receive logic that instructs to start a web service session with the primary server with WebRTC and to generate WebRTC credentials comprising a private key, certificate of the private key, and a fingerprint of the certificate, to store the private key and the certificate, to send the fingerprint to the primary server, and to establish a connection with the primary server using the generated WebRTC credentials.

Yet another aspect of the embodiments relates to a computer program comprising instructions, which when executed by at least one processor, cause the at least one processor to receive a request to generate WebRTC credentials comprising a private key, certificate of the private key and a fingerprint of the certificate, to generate the WebRTC credentials, to exchange fingerprints with the device application via the primary server 1020, to obtain assistance from the primary server 1020 to identify the device application 1010, and to establish a connection between the device application 1010 and the secondary server 1030.

A further aspect of the embodiments relates to a carrier comprising the computer program according to above. The carrier is one of an electronic signal, an optical signal, an electromagnetic signal, a magnetic signal, an electric signal, a radio signal, a microwave signal, or a computer-readable storage medium.

The invention claimed is:

1. A method performed by a server, the method comprising:
   receiving a request for a web service transmitted by a device application, wherein communication between the server and the device application is done via https and Web Real Time Control (WebRTC), and the device application has generated WebRTC credentials comprising a first private key, a first certificate, and a fingerprint of the first certificate, wherein the first certificate is paired with the first private key and the device application used a first fingerprint generation algorithm to generate the fingerprint of the first certificate;
   receiving the fingerprint of the first certificate and a first fingerprint generation algorithm identifier identifying the first fingerprint generation algorithm that was used by the device application to generate the fingerprint of the first certificate;
   storing the fingerprint of the first certificate and the first fingerprint generation algorithm identifier;
   associating the fingerprint of the first certificate with the device application;
   receiving the first certificate from the device application; and
   using the received certificate and the stored fingerprint of the first certificate to identify the device application and to bind the device application to the web service.

2. The method of claim 1, wherein using the received first certificate and the stored fingerprint of the first certificate to bind the device application to the web service comprises:
   using the fingerprint generation algorithm identified by the first fingerprint generation algorithm identifier to calculate a fingerprint of the received certificate; and
   comparing the calculated fingerprint with the stored fingerprint to verify the identify the device application.

3. The method of claim 1, further comprising, when content of the web service is delivered from a secondary server:
   requesting the device application to generate new WebRTC credentials comprising a second private key, second certificate, and a fingerprint of the second certificate, wherein the second certificate is paired with the second private key;
   requesting the secondary server to generate WebRTC credentials comprising a third private key, third certificate, and a fingerprint of the third certificate, wherein the third certificate is paired with the third private key;
   receiving the fingerprint of the second certificate;
   receiving the fingerprint of the third certificate associating the fingerprint of the second certificate to the device application;
   associating the fingerprint of the third certificate to the secondary server;
   forwarding the fingerprint of the second certificate to the secondary server;
   forwarding the fingerprint of the third certificate to the device application; and
   assisting the secondary server to identify the device application.

4. A method performed by a device application, the method comprising:
   requesting a web service from a primary server;
   receiving logic that instructs the device application to start a web service session with the primary server with Web Real Time Control (WebRTC) and to generate first WebRTC credentials;
   generating the first WebRTC credentials, wherein the generated first WebRTC credentials include a first private key, a first certificate, and a first fingerprint of the first certificate, wherein the first certificate is paired with the first private key, and generating the WebRTC credentials comprises generating: 1) the first private key; 2) the first certificate; and 3) the first fingerprint of the first certificate;
   storing the first private key and the first certificate;
   sending the first fingerprint of the first certificate and the first fingerprint generation algorithm identifier identifying the first fingerprint generation algorithm that was used by the device algorithm to generate the first fingerprint of the first certificate to the primary server; and
   establishing a connection with the primary server using the generated first WebRTC credentials, wherein the first WebRTC credentials are for use by the primary server to identify the device application and to bind the device application to the web service.

5. The method of claim 4, further comprising, whenever a new session with the requested web service is being established:
   providing to the primary server the first certificate in a DTLS handshake message when the new session is established such that the primary server can calculate the first fingerprint of the first certificate, and compare the calculated first fingerprint with the stored fingerprint to identify the device application.

6. The method of claim 5, further comprising:
   creating second WebRTC credentials comprising a second private key, second certificate, and a second fingerprint of the second certificate, wherein the second certificate is paired with the second private key;
   sending the second fingerprint of the second certificate to the primary server; and
   receiving a third fingerprint generated by a secondary server; and
   accessing the secondary server, wherein the device application is identified by secondary server with assistance from the primary server.

7. The method of claim 4, wherein the device application is a browser.

8. The method of claim 4, wherein WebRTC identity APIs are used in combination with an Identity Provider to establish the identity of an end user of the device.

9. The method of claim 4, wherein the device application is a native application and wherein the received logic is received at installation of the device application.

10. A server, the server comprising:
    memory; and
    processing circuitry coupled to the memory, wherein the server is configured to:
    receive a request for a web service transmitted by a device application, wherein communication between the server and the device application is done via https and Web Real Time Control (WebRTC), and the device application has generated WebRTC credentials comprising a first private key, a first certificate, and a fingerprint of the first certificate, wherein the first certificate is paired with the first private key and the device application used a first fingerprint generation algorithm to generate the fingerprint of the first certificate;

receive the fingerprint of the first certificate and a first fingerprint generation algorithm identifier identifying the first fingerprint generation algorithm that was used by the device application to generate the fingerprint of the first certificate;

store the fingerprint of the first certificate and the first fingerprint generation algorithm identifier;

associate the fingerprint of the first certificate with the device application;

receive the first certificate from the device application; and bind the device application to the web service using the received certificate and the stored fingerprint of the first certificate.

11. The server of claim 10 wherein the server is configured bind the device application to the web service by performing a process that comprises:

using the fingerprint generation algorithm identified by the first fingerprint generation algorithm identifier to calculate a fingerprint of the received certificate; and comparing the calculated fingerprint with the stored fingerprint to verify the identify the device application.

12. The server of claim 10, wherein the server is further configured to:

request the device application to generate new WebRTC credentials comprising a second private key, second certificate, and a fingerprint of the second certificate, wherein the second certificate is paired with the second private key;

request the secondary server to generate WebRTC credentials comprising a third private key, third certificate, and a fingerprint of the third certificate, wherein the third certificate is paired with the third private key;

receive the fingerprint of the second certificate;

receive the fingerprint of the third certificate associate the fingerprint of the second certificate to the device application;

associate the fingerprint of the third certificate to the secondary server;

forward the fingerprint of the second certificate to the secondary server;

forward the fingerprint of the third certificate to the device application; and assist the secondary server to identify the device application.

13. A device comprising:

memory; and processing circuitry coupled to the memory, wherein the device application is configured to:

request a web service from a primary server;

receive logic that instructs the device application to start a web service session with the primary server with Web Real Time Control (WebRTC) and to generate first WebRTC credentials, wherein the first WebRTC credentials include a first private key, a first certificate, and a first fingerprint of the first certificate, wherein the first certificate is paired with the first private key;

generate the first private key, the first certificate, and the first fingerprint of the first certificate;

store the private key and the certificate;

send the fingerprint of the first certificate and the first fingerprint generation algorithm identifier identifying the first fingerprint generation algorithm that was used by the device algorithm to generate the first fingerprint of the first certificate to the primary server; and establish a connection with the primary server using the generated WebRTC credentials, wherein the first WebRTC credentials are for use by the primary server to identify the device application and to bind the device application to the web service.

14. The device of claim 13, further configured to, provide to the primary server the certificate in a DTLS handshake message when a new session is established such that the primary server can calculate the fingerprint of the certificate, and compare the calculated fingerprint with the stored fingerprint to identify the device application.

15. The device of claim 14, further configured to:

create second WebRTC credentials comprising a second private key, second certificate, and a second fingerprint of the second certificate, wherein the second certificate is paired with the second private key;

send the second fingerprint of the second certificate to the primary server; and receive a third fingerprint generated by a secondary server; and access the secondary server, wherein the device application is identified by secondary server with assistance from the primary server.

16. The device of claim 13, wherein the device application is a browser.

17. The device of claim 13, wherein the device application is configured to use WebRTC identity APIs in combination with an Identity Provider to establish the identity of an end user of the device application.

18. The device of claim 13, wherein the device application is a native application and wherein the native application is configured to receive the logic at installation of the device application.

* * * * *